March 25, 1969 G. MESSEN-JASCHIN 3,434,267
APPARATUS FOR PURIFYING AIR
Filed Sept. 1, 1965

INVENTOR:
G. Messen-Jaschin
BY
Richards & Geier
ATTORNEYS

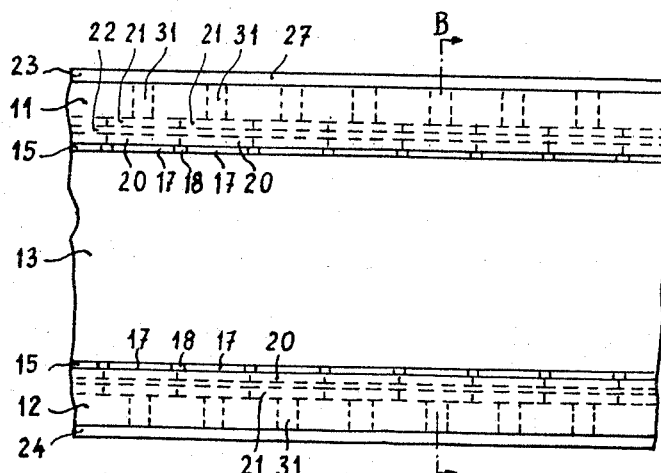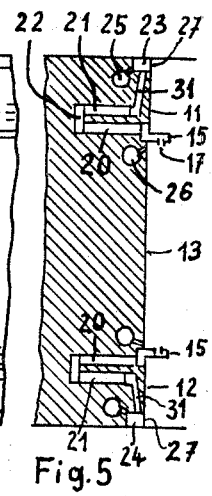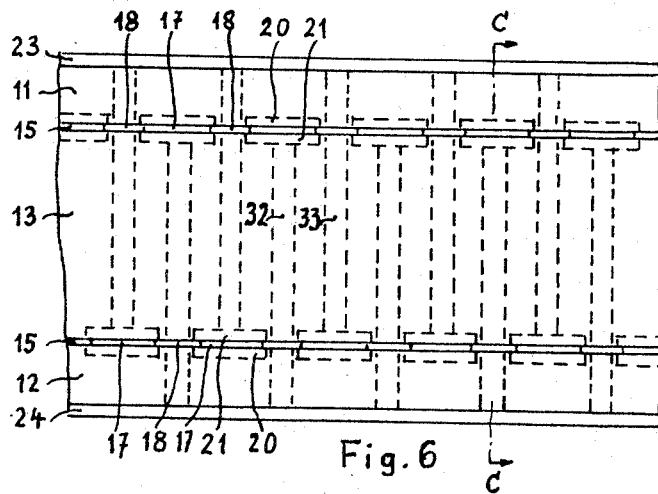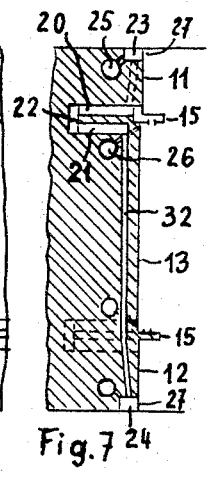

United States Patent Office 3,434,267
Patented Mar. 25, 1969

3,434,267
APPARATUS FOR PURIFYING AIR
Gregori Messen-Jaschin, Sarnen, Switzerland, assignor to G. A. Messen-Jaschin, Sarnen, Switzerland, a firm
Filed Sept. 1, 1965, Ser. No. 484,257
Claims priority, application Switzerland, Sept. 3, 1964, 11,529/64; Apr. 14, 1965, 5,384/65
Int. Cl. B03c 3/00
U.S. Cl. 55—101    9 Claims

ABSTRACT OF THE DISCLOSURE

An installation for purifying air from exhaust gases, the installation having a plurality of electro-filtering devices located in rows along a street below the street level, air inlet openings located above the street level and directed sidewise against the traffic lane of the street. Each electro-filter having one inlet opening and a fan to pass gas from said inlet opening through the electrofilter.

This invention relates to apparatus for purifying air and refers more particularly to large installations for purifying air from exhaust gases of combustion engines of street vehicles.

As is well known, exhaust gas of combustion engines includes components which are poisonous for human beings. The great increase in automobiles and buses driven by combustion engines and circulating in the streets of larger towns and cities results in a danger of air contamination. Exhaust gases of automobiles leave exhaust pipes and enter the air close to ground. These exhaust gases are heavier than air and remain at the ground. At most they can be whirled up by the street traffic but actually not higher than the cards. Thus the poisonous gases remain in the range of pedestrians along both sides of a street. Only a natural wind can blow away these poisonous gases. In large cities the wind is greatly impeded by rows of tall buildings. Furthermore dangerous thermal conditions can develop over large cities during heat spells on account of the strong sun rays, which take place over roofs of tall buildings and completely prevent any flow of air down into the deep lying streets.

It has been suggested already to use ventilators to suck the air off the streets and to guide it through pipes sufficiently high above ground, so that the air will be blown away by natural winds. A cleaning of air by separating the poisonous exhaust gases is not provided in these suggestions. An installation operating according to this principle is logically usable for the protection of persons only under limited conditions in an area where motor vehicles are obliged to stop while their motors are running, for example, adjacent a pay station.

There are many processes known for purifying exhaust gases of combustion engines by removing and binding the poisonous components. Exhaust gases contain poisonous carbohydrates which often contain lead and poisonous carbon monoxide, as well as component parts of air which were sucked in and which are not poisonous in themselves, namely, carbonic acid and nitrogen. There is no oxygen since it was consumed during combustion. The boiling point of carbohydrate gases is about 30° C. It is known in the art to cool exhaust gases by the addition of fresh air until the carbohydrate gases are condensed. These condensates can be even fractionated. It is also known to remove the condensation layer which is thus formed by an electric filter, namely, by guiding the exhaust gases through an electric filter after they passed through a cooling stage with fresh air supply. It is further known to agglomerate the condensation layer in an intermediate step so as to provide better and more effective separation in the following treatment in the electric filter. Only the poisonous carbon monoxide is not separated, but it is known to combust it in a following combustion chamber to carbonic acid. Due to the addition of fresh air during the cooling, the gases leaving the purifying device contain again oxygen so that their composition again resembles natural air to a certain extent. This air also contains an advantageous supply of ozone which is formed in the filter.

Described electric filter installations can be used effectively for purifying exhaust gases of stationary combustion engines, or those which are movable but operate when stationary, such as compressor motors on building locations and they were found to be quite effective as far as purification is concerned. Their drawback is only the large size of the filter installation and also the high price. These two drawbacks make it impossible to supply motor cars circulating in the streets with such installations.

An object of the present invention is to adapt these known electric filter devices in a different manner for purifying air from exhaust gases of vehicles circulating in the streets.

Other objects of the present invention will become apparent in the course of the following specification:

In the accomplishment of the objectives of the present invention it was found desirable to provide a large installation for purifying air from exhaust gases by filtering means, which is characterized by the use of electric filtering devices which are located in rows along the streets and are sunk below the street level. A suction opening for each filtering device is located above the street level and extends sidewise relatively to the direction of traffic. A separate ventilator is provided for each filtering device which withdraws the air to be purified from the street and passes it through the filtering device.

The invention will appear more clearly from the following detailed description when taken in connection with the accompanying drawings, showing by way of example, preferred embodiments of the inventive idea:

In the drawings:

FIGURE 4 is a top view of another street provided with the devices of the present invention.

FIGURE 5 is a transverse section along the line V—V of FIG. 4.

FIGURE 6 is a top view of yet another street provided with the devices of the present invention.

FIGURE 7 is a transverse section along the line VII—VII of FIG. 6.

Figure 1:
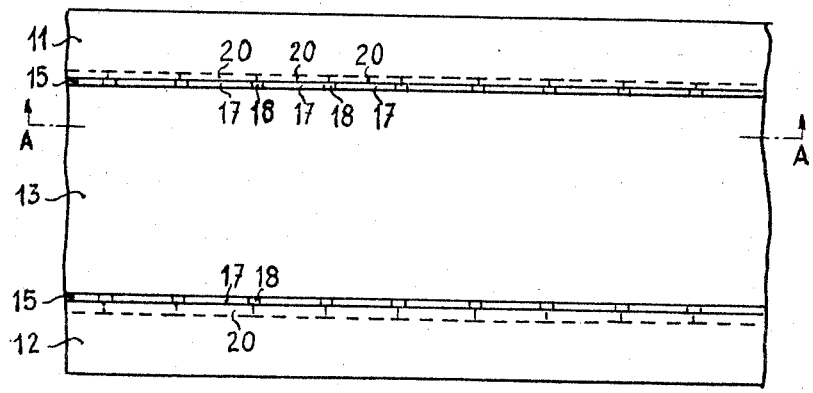
FIGURE 1 is a diagrammatic top view of a street provided with the filtering device of the present invention.

FIGURE 1 of the drawing shows a street having two sidewalks 11 and 12 and a lane 13 for traffic moving in opposite directions. The two sidewalks 11 and 12 are separated from the traffic lane 13 by rising curbstones 15.

In accordance with the present invention electrofilter devices 20 are located along the street in the ground below the street level. Each of the devices 20 is provided with a separate ventilator. The devices 20 are located in a row along the curbstone 15 preferably closer to the sidewalk and are used to suck in from the street air polluted by exhaust gases and to filter it.

Figure 2:
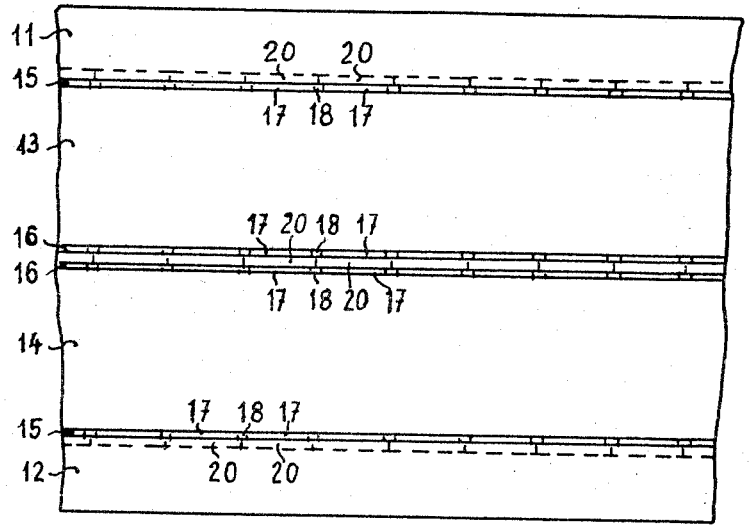
FIGURE 2 is a top view of a street provided with separate lanes of traffic.

FIGURE 2 shows a wide street having two sidewalks 11 and 12 and two traffic lanes 13 and 14 which are separated one from the other. In the middle of the street two spaced curbstones 16 are located; electrofilters 20 provided with separate ventilators are located in a row between the curbstones and below the street level. These filters are provided in order to add their action to those of the electrofilters located along the curbstones 15 along the outer edges of the traffic lanes; they withdraw by suction polluted air from the middle of the street and purify it.

Figure 3:
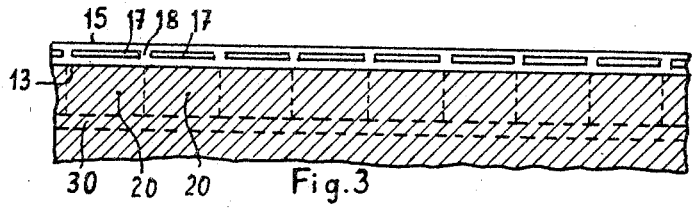
FIGURE 3 is a longitudinal section along the line III—III of FIG. 1.

FIGURE 3 which is a vertical section through a portion of a street, shows further details of the installation. The curbstone 15 separating the sidewalk 11 from the traffic lane 13, extends above the traffic lane. The curbstone 15 is hollow and has suction openings 17 located above the street level and directed sidewise toward the traffic. The openings 17 are provided above separate filtering devices 20 and are a little shorter than the length of the filtering devices. The openings 17 are separated from each other by wall portions 18 which protect the casing constituting the curbstone. A channel 30 is located below the filtering devices 20 and is used to withdraw the sucked in air which was purified by the filters and to guide it back to an outer surface.

The electrofiltering devices 20 must be protected from the penetration of water and solid parts if they are to operate securely. It is necessary that the suction openings 17 be located sufficiently high above the street level so that street water should not be able to reach them. The suction openings must be also protected against sprayed water and rain. A coarse filtering device within the range of the suction openings is necessary to keep street dirt, paper, leaves, gravel, larger insects, etc. away from the electrofiltering devices.

The electrofiltering devices which are built into the ground in a row along the street, are preferably of an elongated and narrow shape and extend in a row in their longitudinal direction. The individual filters can be comparatively small.

However, it is not necessary that the filters be placed directly side by side, as shown in FIGS. 1–3; they can be located at spaced intervals from one another.

However, it is better to use a larger number of smaller filters than a smaller number of larger filters. The efficiency of the installation increases with the increase in the continuity of air sucked away from the street traffic lane. In order to increase efficiency it is possible to demand for the protection of the pedestrians that the exhaust pipes of motor cars be directed somewhat toward the ground and toward the end edge of the traffic lane, so that poisonous exhaust gases will be ejected toward the suction openings in the curbstones. The efficiency of the installation is greater when air is quiet than when there is a wind. This is of advantage since when there is no natural wind the danger of poisoning through exhaust gases increases. Furthermore, an advantage of the installation of the present invention is that the electrofilters used therein can be of a simpler technical construction than those built in for the purpose of purifying exhaust gases in a combustion motor, since the cooling step required for the condensation of carbohydrate gases and that of adding fresh air are eliminated; this is due to the fact that according to the present invention exhaust gases are ejected into the fresh air, the temperature of which usually does not exceed the condensation temperature of carbohydrate gases, so that they condense by themselves.

The present invention has an advantage for the circulation of traffic in that the curbstone 15 separates the sidewalks 11 and 12 from the traffic section 13 in such manner that the pedestrians are prevented from stepping into the street except at street crossings. A further advantage is attained by providing an upwardly extending curbstone 15 which will engage the wheels of vehicles, thus protecting pedestrians from vehicles which might otherwise drive into the sidewalk.

Electrofilters cannot remove the poisonous carbon monoxide contained in the exhaust gases. Therefore, the present invention provides a combustion chamber connected with each electrofiltering device, air being guided through the chamber after leaving the filter, whereby the poisonous carbon monoxide is combusted into carbonic acid. These combustion chambers can be constructed in a manner known per se and be provided with electrically heated incandescent wires which produce the combustion temperature. The outgoing air of the filter has enough oxygen for the combustion and the ozone content produced in the filters can be partially reduced again. The heat content of the withdrawn air can be used for heating purposes, for example, for heating the street against frost.

The embodiment shown in FIGS. 4 and 5 shows a street provided with two sidewalks 11 and 12 separated by rising curbstones 15 from the traffic lane 13; electrofilters 20, each provided with a separate ventilator, extend in rows along the curbstones closer to the sidewalks, following the street and below the street level. Adjacent each filter 20 and closer to the sidewalk is a combustion chamber 21 which is separated from the filter 20 by a wall of earth or stone and the bottom of which is connected with the filter 20 by a passage 22. The outer side of the sidewalk 11 has a discharge gutter 23 and the outer side of the sidewalk 12 has a discharge gutter 24. These discharge gutters are connected with canalisation pipes 25 and are necessary to remove water from the sidewalks which due to the projecting curbstones 15 cannot reach any more the gutter of the traffic lane and the canalisation pipe 26. A channel 31 leads from each combustion chamber 21 to the outer edge of the sidewalk and opens into a side wall of the discharge gutter 23 or discharge gutter 24. These discharge gutters are preferably provided with screens 27. Air is sucked in from the street traffic lane through the suction openings 17 in the curbstones 15 and through the filters located under them. Outgoing air flows from the filters through the passages 22 into the combustion chambers, rises therein and is withdrawn by channels 31 into the discharge gutters 23 and 24, passing into the atmosphere through the screens 27.

Heat is developed in the combustion chambers 21 by the combustion of carbon monoxide. The air leaving the combustion chambers is hot. It can be used for heating purposes. For example, the hot outgoing air can be used for heating the street traffic lane to protect it from frost and to prevent the formation of ice.

FIGURES 6 and 7 show a corresponding embodiment of the present invention which differs from that shown in FIGS. 4 and 5, in that the electrofilters extending in a row along the curbstone 15 are not located one next to the other, but that a space is provided between two adjacent filters 20. This increases the spacings 18 between two suction openings 17 in the curbstone 15. Filters 20 are again located closed to the sidewalk relatively to the curbstone. A combustion chamber 21 is located close to each filter 20 toward the traffic side and is separated therefrom by a wall of earth or stone, the bottom of the chamber 21 being connected with the filter 20 by a connecting passage 22. An air-withdrawing channel 32 extends from each combustion chamber 21 of the sidewalk 11 under the surface of the traffic lane 13 and between two combustion chambers 21 and filters 20 of the sidewalk 12 into the discharge gutter 24. Similarly an air-withdrawing channel 33 extends from each combustion chamber 21 of the sidewalk 12 under the surface of the traffic lane 13 and between two combustion chambers 21 and filters 20 of the sidewalk 11 into the discharge gutter 23. This arrangement provides that the traffic lane is provided at uniform intervals transversely to the direction of traffic with air discharging channels which conduct hot air and heat the street. Since air-withdrawing channels 32 and 33 cross the traffic lane alternately from left to right and from right to left, a uniform division of heat is provided over the entire traffic lane despite drops in temperature in each channel; this avoids the flow of hot air out of the discharge gutters 23 and 24, which may be unpleasant for pedestrians and for houses along the street. Furthermore, this can be avoided by the provision of air-withdrawing channels which would conduct discharged air after it has left the filtering devices away from the vicinity of the pedestrains. An advantageous possibility of removing air from the vicinity of pedestrians consists in the provision of vertical shafts connected with the houses facing the street, such shafts starting at the air-withdrawing channels extending along the street under the street level and conducting the air leaving the filtering devices over the house tops into the free atmosphere.

Figure 8:
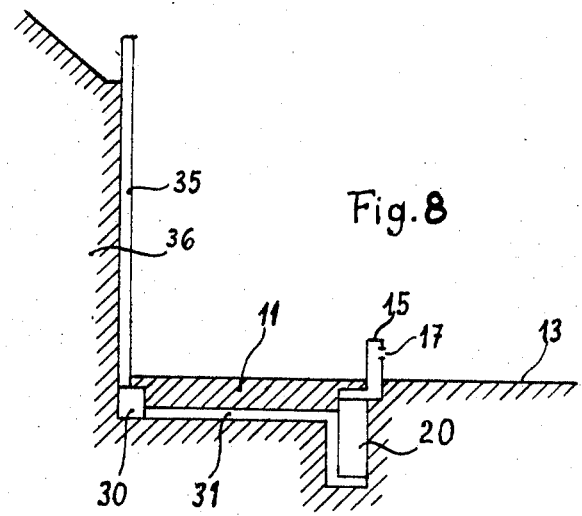
FIGURE 8 shows in section a part of a street with a filter installation and means withdrawing outgoing air into the atmosphere.

FIG. 8 shows a construction having a sidewalk 11 separated by a curbstone 15 from the traffic lane 13, the curbstone 15 extending along the street. Under the curbstone there is a row of electrofilters each provided with a ventilator, which suck in the air through suction openings 17 located sidewise adjacent the traffic lane and directed toward it, the air being passed through the filter. Under the street level along the houses facing the street there is an air-withdrawing channel 30 and the outlet of each filter 20 is connected by a passage 31 with this air-withdrawing channel 30. Shafts 35 extend upwardly close to the houses 36 from this air-withdrawing channel 30 and they guide the exhaust air from the filters above the roof tops into the free atmosphere.

Another advantageous possibility of removing treated air consists in that the connecting channels may be provided for sewage canalisation, which are connected with the sewage channels located under the street level and extending along the streets, and which conduct the air emerging out of the filtering devices into the canalisation shafts.

Figure 9:
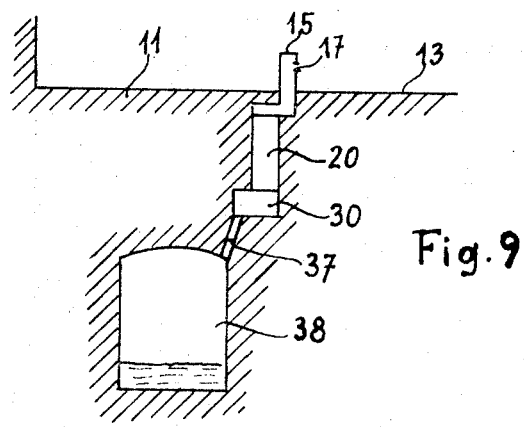
FIGURE 9 shows in section a part of a street with a filter installation and means withdrawing outgoing air into a sewer.

In the arrangement shown in FIG. 9 an air-withdrawing channel 30 extends directly under the filters 20 along the street and it receives the air delivered by the filters. This air-withdrawing channel is connected by passages 37 with a large canalsation shaft 38 which receives the outflowing air.

In accordance with the two last-mentioned embodiments air coming from the filters is introduced into the atmosphere out of reach of the pedestrians. Consequently, the small amount of carbon monoxide contained in the exhaust air can not have any damaging effects.

What is claimed is:

1. An installation for purifying street air from exhaust gases, comprising a plurality of electrofiltering devices located in rows in the direction of a street below the street level, and air-suction means having openings located above the street level and above the filtering devices and directed sidewise against the traffic lane of the street and a separate ventilator for each electrofiltering device, said ventilators sucking the air to be purified from the streets and passing it through the electrofiltering devices.

2. An installation in accordance with claim 1, comprising an air-withdrawing channel located under each row of electrofiltering devices.

3. An installation in accordance with claim 1, wherein the electrofiltering devices are located in rows along the two sides of the traffic lane of the street.

4. An installation in accordance with claim 1, wherein the electrofiltering devices are located in rows along two sides and along the middle of the street between two opposed traffic lanes thereof.

5. An installation in accordance with claim 1, wherein an upstanding curbstone extends between a sidewalk and the traffic lane of a street, said air suction openings being provided in said curbstone.

6. An installation in accordance with 5, wherein the electrofiltering devices are of narrow elongated shape and their rows extend in their longitudinal directions, said openings being shorter than the electrofiltering devices and being separated from each other by portions of the curbstone.

7. An installation for purifying street air from exhaust gases, comprising a plurality of electrofiltering devices located in rows in the direction of a street below the street level, and air-suction means having openings located above the street level and above the filtering devices and directed sidewise against the traffic lane of the street, a separate ventilator for each electrofiltering device, said ventilators sucking the air to be purified from the streets and passing it through the electrofiltering devices, a separate combustion chamber for carbon monoxide combustion located adjacent each electrofiltering device and spaced therefrom, and a connecting channel connecting the bottom of the combustion chamber with the outlet side of the electrofiltering device.

8. An installation in accordance with claim 7, wherein the street has at least one discharge gutter, the installation having a separate air-withdrawing channel connected with each combustion chamber and opening into the side wall of said discharge gutter.

9. An installation for purifying street air from exhaust gases, the street having a traffic lane, sidewalks on opposite sides of the traffic lane and discharge gutters extending between the sidewalks and the traffic lane, the installation comprising a plurality of electrofiltering devices located in two rows on opposite sides of the street below the street level, a separate combustion chamber for carbon monoxide combustion located adjacent each electrofiltering device and spaced therefrom, a separate connecting channel connecting the bottom of each combustion chamber with the outlet side of a separate electrofiltering device, a plurality of air-withdrawing channels connected with said combustion chambers, said air-withdrawing channel extending alternately from one side of the street and then from the other side thereof under the street level and across the street to the discharge gutter located on the opposite street side, said gutters having openings communicating with said airwithdrawing channels and directed sidewise against the traffic lane, and ventilators connected with said air withdrawing channels for sucking the air to be purified from the streets and passing it through the electrofiltering devices.

References Cited

UNITED STATES PATENTS

| | | | |
|---|---|---|---|
| 334,158 | 1/1886 | Beard | 55—220 X |
| 697,369 | 4/1902 | Shone et al. | 4—219 |
| 795,772 | 7/1905 | Janney | |
| 802,647 | 10/1905 | Koch | 94—31.1 X |
| 820,945 | 5/1906 | Booraem | 15—301 X |
| 855,409 | 5/1907 | Morris | 98—49 |
| 950,332 | 2/1910 | Knox | 4—219 |
| 1,224,448 | 5/1917 | Davidson | 94—33 |
| 1,728,493 | 9/1929 | Kessler | 98—49 |
| 2,285,387 | 6/1942 | Barthdomai | 98—49 |
| 2,415,471 | 2/1947 | Dorfan | 55—418 X |
| 2,604,023 | 7/1952 | Messiah | 94—33 |
| 2,672,206 | 3/1954 | Keist | 55—118 |

(Other references on following page)

UNITED STATES PATENTS

| | | | |
|---|---|---|---|
| 2,719,705 | 10/1955 | Watson | 261—112 X |
| 2,793,707 | 5/1957 | Rinaker | 23—2 X |
| 2,937,712 | 5/1960 | Woods | 55—257 X |
| 3,146,072 | 8/1964 | Morgan. | |
| 3,157,479 | 11/1964 | Boles | 55—146 |
| 3,233,391 | 2/1966 | Olsen | 55—126 X |
| 3,299,620 | 1/1967 | Hollingworth | 55—472 X |

HARRY B. THORNTON, *Primary Examiner.*

D. E. TALBERT, *Assistant Examiner.*

U.S. Cl. X.R.

55—385, 342, 418, 410, 267, 279; 98—1, 49; 23—2; 94—25, 31.1, 33; 4—219